United States Patent [19]

Tanno

[11] Patent Number: 4,611,233

[45] Date of Patent: Sep. 9, 1986

[54] DIGITAL NON-ADDITION MIXING APPARATUS FOR VIDEO SIGNALS

[75] Inventor: Takao Tanno, Tokyo, Japan

[73] Assignee: NEC Corporation, Tokyo, Japan

[21] Appl. No.: 497,899

[22] Filed: Mar. 25, 1983

[30] Foreign Application Priority Data

May 25, 1982 [JP] Japan ............................ 57-88244

[51] Int. Cl.$^4$ ........................................... H04N 5/14
[52] U.S. Cl. ..................................... 358/160; 358/183
[58] Field of Search ............... 358/183, 160, 182, 181, 358/22; 328/137, 158, 150, 147, 116; 307/351, 355, 463, 464, 231, 529; 375/103

[56] References Cited

U.S. PATENT DOCUMENTS

| | | | |
|---|---|---|---|
| 3,506,853 | 4/1970 | Mellot | 307/351 |
| 4,140,920 | 2/1979 | Dao et al. | 307/355 |
| 4,419,595 | 12/1983 | Reiner | 307/355 |
| 4,420,770 | 12/1983 | Rahman | 358/183 |

Primary Examiner—James J. Groody
Assistant Examiner—David E. Harvey
Attorney, Agent, or Firm—Laff, Whitesel, Conte & Saret

[57] ABSTRACT

A plurality of decoders receive digital video data represented by a binary code. The decoders send over a plurality of output lines, the number of which corresponds to the maximum values expressed by the binary code. The decoders provide an output to one of the plurality of output lines in accordance with the binary code. A wired-OR network connects the plurality of output lines with each other. A priority encoder receives signals on the plurality of output lines which are derived from the wired-OR network and encodes them into a binary code in accordance with the one output corresponding to the largest value.

10 Claims, 7 Drawing Figures

DIGITAL NON-ADDITION MIXING APPARATUS FOR VIDEO SIGNALS

BACKGROUND OF THE INVENTION

This invention relates to a digital video signal processing apparatus, and more particularly, to a digital non-addition mixing apparatus. A non-addition mixing (NAM) apparatus is adapted to receive a plurality of video signals and to output the signal having the highest amplitude.

A prior art digital non-addition mixing apparatus is composed of unit circuits, each receiving two digital video signals and including a comparator and a selector for selecting one higher level video signal in response to the output of the comparator. In the prior art digital non-addition mixing apparatus, such a unit circuit is connected in a tournament form if the number of input digital video signals to this non-addition mixing apparatus is increased to more than two. However, in circuits constructed in the tournament form, the required number of unit circuits is determined by the number of the input digital video signals. When the number of input digital video signals increases, the circuit configuration of the prior art apparatus becomes more complicated. Moreover, the signal processing time also increases greatly.

SUMMARY OF THE INVENTION

Therefore, an object of the present invention is to provide a non-addition mixing apparatus which is capable of preventing the steep increase of the circuit configuration even when the number of input digital video signals is increased. Another object is to enable the signal processing to be completed within a constant period of time, regardless of the number of input digital video signals.

According to the present invention, a digital non-addition mixing apparatus comprises a plurality of decoders which receive digital video data represented by a binary code. The decoders have a plurality of output lines, the number of which corresponds to the maximum values expressed by the binary code. The decoders provide an output to one of the plurality of output lines in accordance with the binary code. A wire-OR network connects the plurality of output lines derived from the plurality of decoders with each other. A priority encoder receives signals from the plurality of output lines derived from the wired-OR network and encodes them into a binary code in accordance with the one output corresponding to the largest value.

DESCRIPTION OF THE PREFERRED EMBODIMENT

Figure 1:
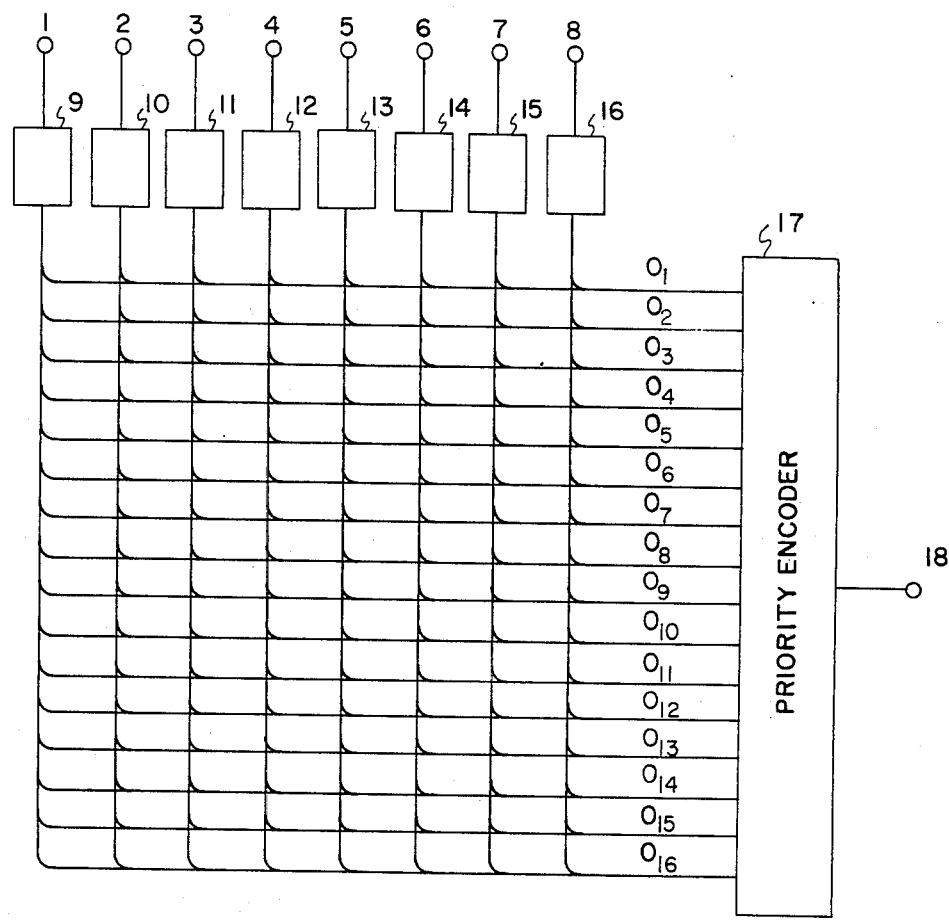
FIG. 1 is a block diagram which illustrates an embodiment of the present invention.

Referring to FIG. 1, an embodiment of the present invention includes digital video data input terminals 1 to 8. Decoder circuits 9 to 16 are adapted to receive digital video data from the terminals 1 to 8 and to deliver a signal to sixteen output lines, the number of the output line receiving said delivered signal corresponding to the values represented by the digital data. A wired-OR network interconnects the sixteen output lines which receive signals delivered from the decoders 9 to 16. A priority encoder circuit 17 is adapted to receive the sixteen output lines from the wired-OR network, and to send output signals to a video data output terminal 18.

The operation of the embodiment of FIG. 1 will now be described. Eight video sources supply data to terminals 1 to 8, each source giving video data in the form of a 4-bit binary code, applied to decoders 9 to 16, respectively.

Figure 2:
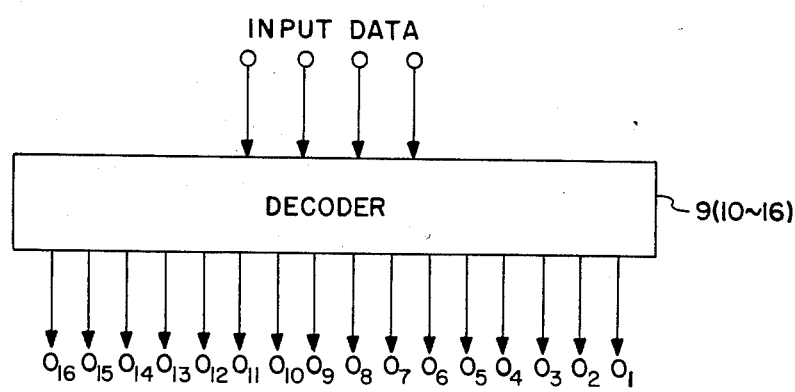
FIG. 2 illustrates an input and an output of the decoder shown in FIG. 1.

Each of the decoders shown in FIG. 1 has four input terminals and sixteen output terminals, as shown in FIG. 2, for example. Referring to FIG. 2, the 4-bit binary data is decoded and one of the sixteen output lines $0_1$ to $0_{16}$ reaches an active state corresponding to the 4bit binary code.

The sixteen output lines of the decoders are connected to a wired-OR network and the wired-OR sixteen lines are connected to a priority encoder circuit 17, as shown in FIG. 1.

In the priority encoder 17, the output signals on the wired-OR sixteen lines are encoded to a 4-bit binary code, based on one active state line, which corresponds to the highest priority wire.

According to the present invention, the output lines from the decoders 9 to 16 are connected to the wired-OR gates, in parallel. Therefore, when the number of input digital video date is increased, the increase is easily accommodated by a decoder and by connecting its output lines to the wired-OR network. Further, this invention eliminates the heretofore required increase of the processing time even when the number of the input digital video data is increased. Also, the enlargement of the circuit configuration to accommodate the increase of the input digital video data is limited, as compared with the increase in the prior art digital non-addition mixing apparatus.

Figure 3:
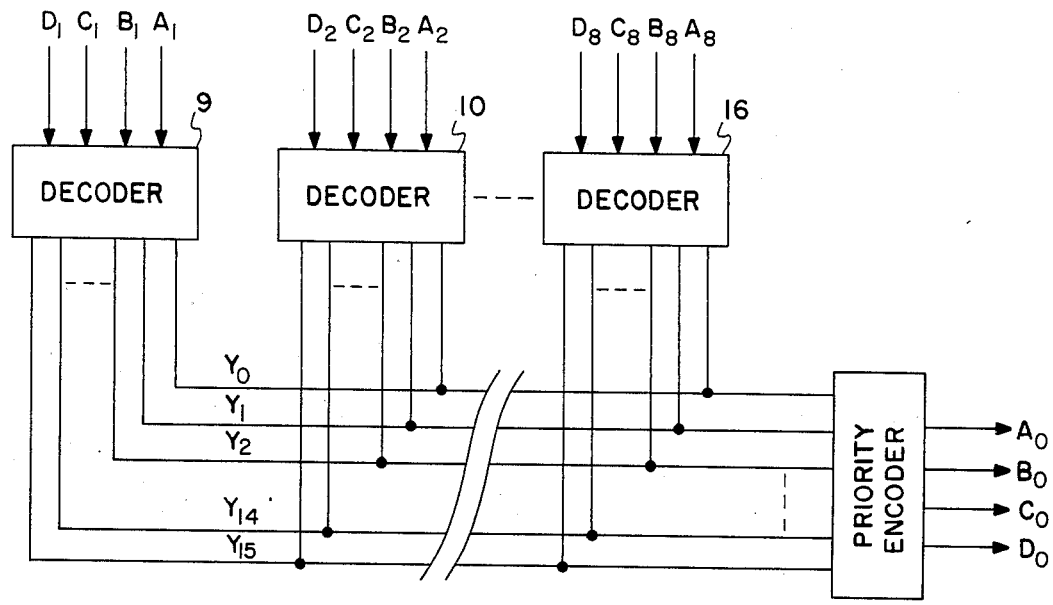
FIG. 3 is a detailed view showing the line connections between decoders and a priority encoder.

Referring to FIG. 3, showing a practical line connection, the 4-bit digital video data ($A_1$ $B_1$ $C_1$ $D_1$), ($A_2$ $B_2$ $C_2$ $D_2$), . . . are supplied to the decoders 9, 10, . . . , respectively. The sixteen output lines $Y_0$ to $Y_{15}$, from the decoders, are interconnected by the wired-OR network. For example, the decoder 9 receives the digital video data (0, 0, 1, 1) and provides an output onto the line $Y_3$ in the sixteen lines $Y_0$ to $Y_{15}$. The decoder 10 receives the input digital video data (1, 1, 1, 0) and provides an output onto the line $Y_{14}$. If the data (1, 1, 1, 0) to the decoder 10 is the greatest among all input data being received by the decoders 9 to 16, the priority encoder 17 provides the digital data (1, 1, 1, 0) in response to the output on the line $Y_{14}$.

Figure 4:
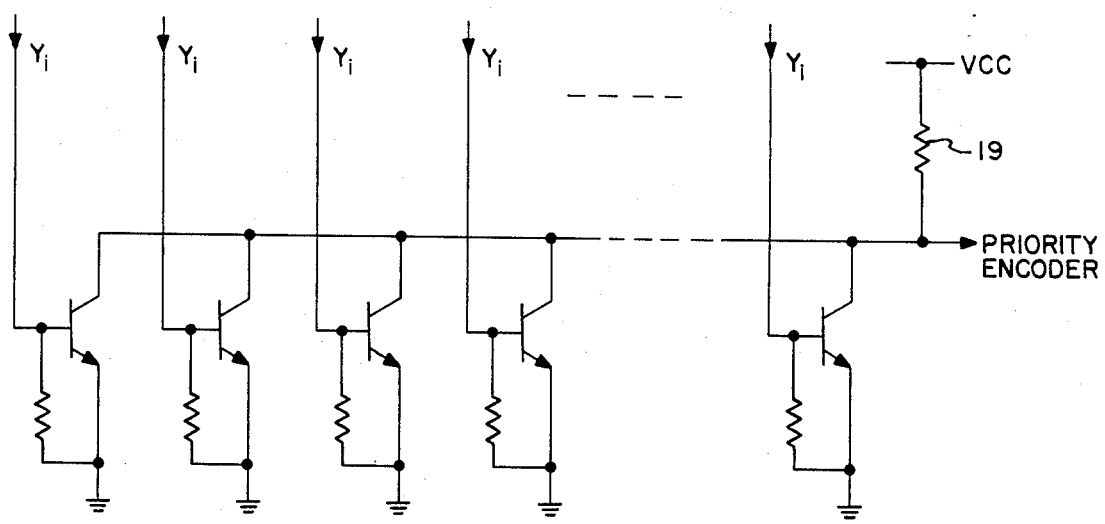
FIG. 4 illustrates an example of the construction of a wired OR circuit corresponding to one output line from the decoder.

FIG. 4 is a circuit diagram of a part of the wired-OR network corresponding to one output line. The collectors of a plurality of transistors are connected to the same output line. A pull-up resistor 19 is also connected thereto. Output lines $Y_i$, corresponding to equal input digital data delivered from decoders 9 to 16, are connected to the bases of the transistors.

According to the present invention, a non-addition mixing condition can be varied by modifying the connection between the decoder and the priority encoder. Therefore, the present invention may be used in various ways. It may be utilized not only to carry out a non-addition mixing process in response to the magnitudes of a plurality of input data, but it could also obtain a plurality of outputs with different simultaneous conditions, by employing a plurality of priority encoders and by setting special conditions to the plurality of priority encoders, respectively.

Figure 5:
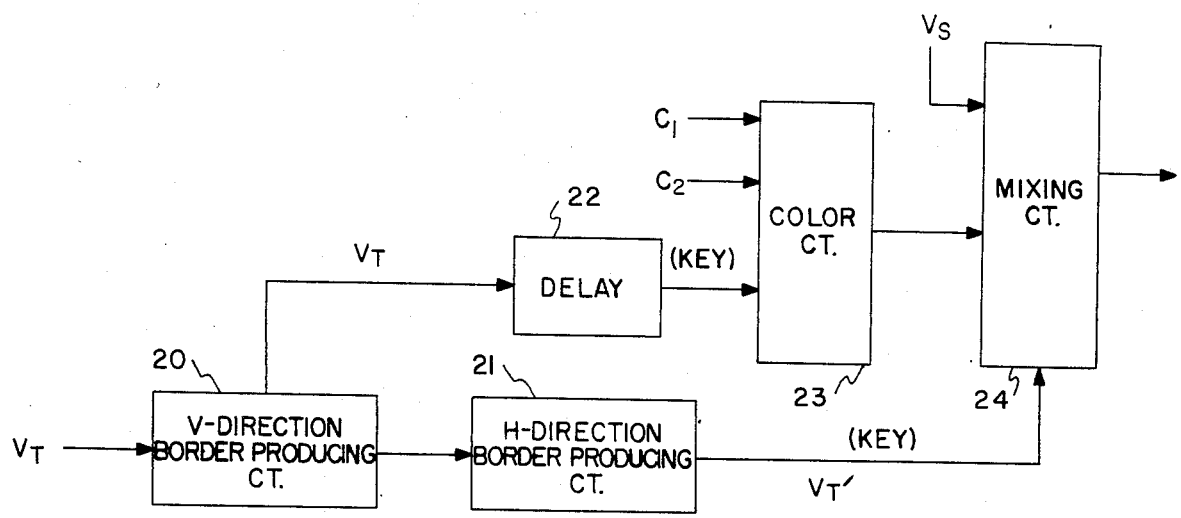
FIG. 5 is a block diagram showing a superimposing special effect apparatus using the non-addition mixing apparatus according to the present invention.

The non-addition mixing apparatus, according to the present invention, can be applied to not only the non-addition mixing of a plurality of video signals, but also to producing special effects, an example of which is shown in FIG. 5. FIG. 5 shows the construction of a superimposing special effects apparatus for superimposing a letter with a border onto a television screen.

For example, a monochrome video signal $V_t$ is converted into a 4-bit binary code representing a letter which is to be inserted. This code is supplied from an external circuit (not shown). This digital video signal $V_t$ is supplied to a vertical border producing circuit 20 which extends the height of the letter in the vertical direction, and then to a horizontal border producing circuit 21 which extends the width of the letter in the horizontal direction in order to obtain a signal $V_t'$, representing an enlarged letter.

The phase-regulated original video signal $V_t$ is delivered from the vertical border producing circuit 20 to a delay unit 22 in order to compensate for the phase delay occurring in the horizontal border producing circuit 21. The resulting signal is sent to a coloring circuit 23 which colors the letter and the border. Digital video signals $C_1$ and $C_2$, representing first and second colors, respectively, are supplied to the coloring circuit 23. In the coloring circuit 23, the letter and the outer side of the letter are colored in the first color and the second color, respectively, under the control of the signal $V_t$ delivered from the delay circuit 22, control of the signal $V_t$ delivered from the delay circuit 22, as a key signal. The resultant colored video signal is supplied to a mixing circuit 24. The mixing circuit 24 inserts the colored video signal from the coloring circuit 23 into another video source $V_s$, under the control of the enlarged letter signal $V_t'$, which is delivered from the H-direction border producing circuit 21, as a key signal. Consequently, a digital video signal is obtained for indicating a television picture shown in FIG. 6.

Figure 6:
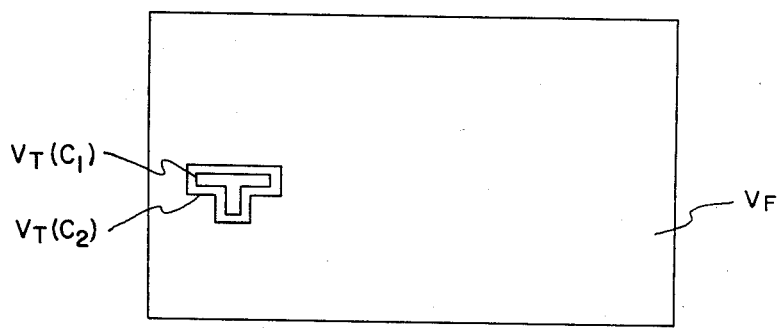
FIG. 6 shows the effective picture obtained by the superimposing special effect apparatus shown in FIG. 5.

Referring to FIG. 6, the letter in the first color $C_1$ and the border in the second color $C_2$, surrounding the letter, are superimposed into the video source signal $V_s$.

Figure 7:
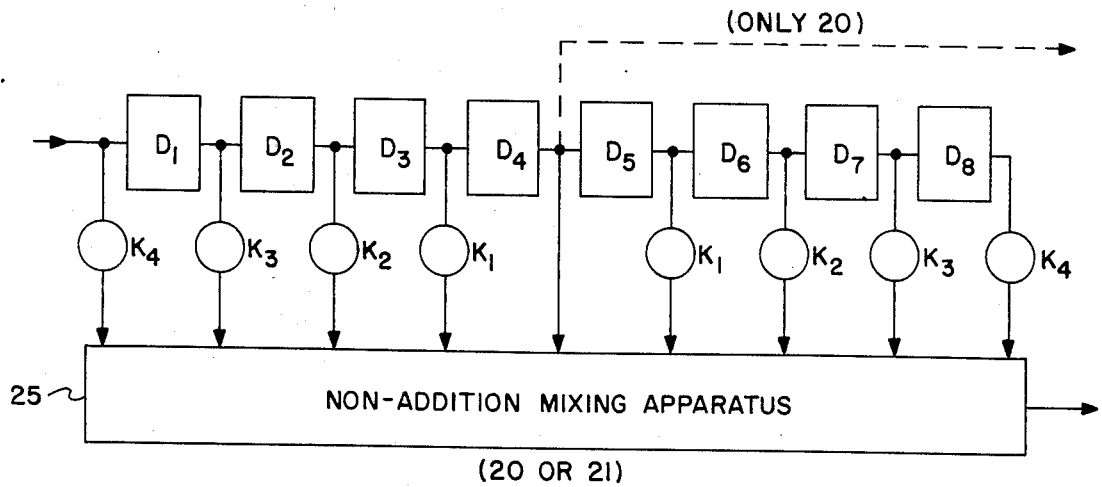
FIG. 7 illustrates the construction of a border producing circuit of FIG. 5.

FIG. 7 shows the vertical border producing circuit 20 and the horizontal border producing circuit 21. An input digital signal $V_t$ represents the letter and is supplied to 8-step delay units $D_1$ to $D_8$. The input signal $V_t$ and eight output signals delivered from the delay units $D_1$ to $D_8$ are supplied to a non-addition mixing apparatus 25, according to the present invention. The enlarged signal representing the letter increased in height and width is generated in this non-addition mixing apparatus 25. Coefficient units $k_1$ to $k_4$ are inserted in the eight output lines, except for the center output line. The coefficients provide a soft edge effect. For example, the coefficients of the units $k_1$ to $k_4$ are set to 0.8, 0.6, 0.4 and 0.2, respectively.

The delay time of the delay units $D_1$ to $D_8$ in the vertical border producing circuit 20 is one horizontal period and the delay time in the horizontal border producing circuit 21 is 70 ns. In the vertical border producing circuit 20, the digital video signal $V_t$ is extracted from the delay unit $D_4$ in order to supply it to the delay unit 22 (FIG. 5). The delay time in the delay unit 22 shown in FIG. 5 is 280 ns when the delay time of the delay units $D_1$ to $D_8$ in the horizontal border producing circuit 21 is 70 ns.

Encoders SN74LS348 or SN74LS148, manufactured by Texas Instruments, can be used as the priority encoder in the non-addition mixing apparatus according to the present invention.

Those who are skilled in the art will readily perceive how to modify the invention. Therefore, the appended claims are to be construed to cover all equivalent structures which fall within the true scope and spirit of the invention.

What is claimed is:

1. An electrical circuit for providing a non-addition signal mixing apparatus comprising:
   a plurality of decoder means, each of said decoder means being adapted to receive digital video data in a form of a binary code and having a plurality of output lines, each of said decoder means applying an output signal to at least one of said output lines in response to said binary code, the number of said output lines corresponding to a possible value as expressed by said binary code;
   matrix OR-circuit means for interconnecting corresponding output lines of said plurality of decoder means to produce corresponding OR outputs; and
   encoder means for encoding said corresponding OR outputs into non-addition mixed data depending on a predetermined priority of said corresponding OR outputs.

2. A digital video processing apparatus comprising:
   a plurality of delay means for serially receiving a video signal in a form of a binary code;
   a plurality of decoder means, each of said decoder means having input lines and a plurality of output lines, means for connecting respective outputs of said plurality of delay means to respective input lines of said plurality of decoder means, each of said decoder means applying an output to at least one of said output lines in response to the binary code output of said delay means which is a delayed video signal, the number of said output lines corresponding to a possible value which may be expressed by said binary code;
   matrix OR-circuit means for interconnecting corresponding output lines of said plurality of decoder means to produce corresponding OR outputs; and
   encoder means for encoding said corresponding OR outputs into data in a form of a binary code which depends on a predetermined priority order of said corresponding OR outputs.

3. A digital video processing apparatus as claimed in claim 2, wherein said connecting means includes coefficient means for varying the level of said delayed video signal.

4. A system for mixing digital video signals comprising a plurality of input terminals for receiving binary digital video signals from a plurality of different sources, a plurality of decoder means, each of said decoder means being associated with each of said input terminals, each of said decoder means having a plurality of output lines for supplying respective output signals, priority encoder means having a plurality of input lines, a matrix OR-circuit means respectively interconnecting said plurality of output lines of each of said decoder means with said plurality of input lines of said priority encoder means, whereby each of said respective output signals of each of said decoder means is supplied to a respective input line of said priority encoder means which, in turn, assigns a priority order to said plurality of input lines of said priority encoder means.

5. The system of claim 4 wherein said binary digital video signals represent different images whereby said priority order assigned by said priority encoder means enables some of said different images to be displayed while suppressing others.

6. The system of claim 5 further including means for adjusting the relative size of said displayed images.

7. The system of claim 6 further including means for forming borders for said displayed images.

8. The system of claim 7 further including means for supplying selected colors to said borders and to said displayed images.

9. The system of claim 8 further including means for selectively delaying said border signals to give a soft edge effect.

10. The system of claim 5 wherein said displayed images are alpha-numerical characters further including means for separately adjusting the height and width of said alpha-numerical characters.

* * * * *